April 23, 1957    K. G. KAUFMANN ET AL    2,789,445
MECHANICAL GEAR RATIO CHANGING MECHANISM
Filed June 30, 1953

INVENTORS
Karl G. Kaufmann &
James L. Owings
BY Morrish Cabrin
ATTORNEY

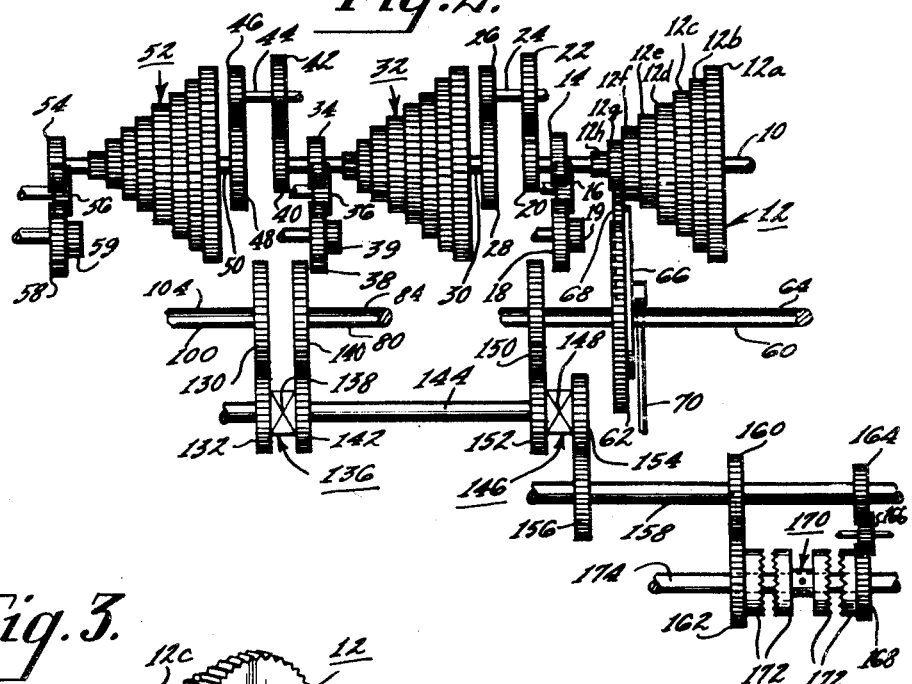

United States Patent Office 2,789,445
Patented Apr. 23, 1957

2,789,445
MECHANICAL GEAR RATIO CHANGING MECHANISM

Karl George Kaufmann, Pennsauken Township, Camden County, N. J., and James Lee Owings, Gladwyne, Pa., assignors, by mesne assignments, to the United States of America as represented by the Secretary of the Air Force Application June 30, 1953, Serial No. 365,126

1 Claim. (Cl. 74—681)

This invention relates to ratio changing mechanisms, and more particularly to an improvement in mechanical gear ratio changers.

One of the problems arising in the operation of beacon navigation equipment of the Shoran type, such as that described by G. C. Danielson in the book "Radar Beacons," pp. 426–33, published by the McGraw-Hill Book Co. (vol. 3, Radiation Laboratory Series, 1947), is that of converting variable electronic measurements into direct representations of distances. One such operation requires the multiplication of a figure representative of a trigonometric function by a value representative of a changeable angle.

The multiplying operation occurring in the Shoran system is thus, in effect, a change of rotative movement in proportion to a constant value. The problem is complicated, however, by the particular requirements of shoran equipment, which must be compact yet precise. The components of the shoran system must be accurate to one part in a thousand, and any multiplying device must as well be accurately indexed at all times in relation to a given set of conditions and also continuous in operation during all possible changes in the operating variables.

The structures of the prior art are not wholly satisfactory for such an application. Electrical methods of achieving the desired result, for example, must operate within limits and thus cannot have the desired continuity of operation. Furthermore, electrical equipment cannot attain both the desired accuracy and a large dynamic range of operation without extremely complicated design, since it is subject to variations due to tolerances in components and power supplies, and to changes due to usage of the system. These practical difficulties also mean that the equipment cannot easily provide a wide range of accurate multiplier values.

The geared structures used heretofore for multiplying or ratio changing are likewise not wholly satisfactory because they require either an excessively large number of gears to supply the desired range of values, or else need complicated clutching arrangements to select any of the values. The compactness necessary to shoran equipment, particularly as used in aircraft, cannot satisfactorily be supplied by such structures.

Various friction integrators are used in computing equipment to perform similar multiplying functions. These integrators are shown generally by Svoboda in the book "Computing Mechanisms and Linkages," at pp. 23–26, published by the McGraw-Hill Book Co. (vol. 27, Radiation Laboratory Series, 1948). They include various friction-wheel, double-ball, and cylinder-sphere-disk integrators, all of which rely on frictional contacts and movements. The action of a friction-wheel integrator, for example, requires that the wheel be pressed against a plane disk. The rotation of the disk represents one variable and the relative position of the friction-wheel with respect to the disk the second variable. The output is then generated as a rotation of the friction-wheel. The use of frictional contacts, however, means that slippage will occur unless the operating parts are forced together, in which case a considerable, and undesirable, load is forced into the system. Furthermore, placement of the friction-wheel must be extremely precise if the output is to be of the required order of accuracy.

Accordingly, it is a principal object of this invention to provide an improved ratio changer which may be easily adjusted to a wide range of values.

A further object of this invention is to provide an accurate ratio changer which maintains its accuracy over its entire range of operation.

Still another important object of this invention is to provide a simple and compact rotation multiplying device.

Another object of this invention is to provide a ratio changer which operates without stops or ambiguities with a bidirectional rotative input.

Yet another object of this invention is to provide an improved ratio changer which is precisely indexed at all points in its operation.

It is still a further object of this invention to provide an improved ratio changer which is accurate despite variations in its environment.

These and other objects are accomplished in this invention by employing a succession of geared stages, the stages having a predetermined rotative relation, such as 1, .1, and .01. A sequence of gears within each stage supply incremental variations of the basic rotation, and these incremental variations are sampled as desired within each stage. The sampled rotations are then algebraically combined to produce a final output.

In the preferred embodiment the invention utilizes three decade stages, each having a cone of gears on an input shaft within the stage. The three input shafts are coupled together, but with a 10:1 reduction between them. Each cone of gears represents a substantial part of a decade sequence, so that within each stage 10 incremental variations of the input rotation are available. A sampling gear within each stage can be moved to sample any of the incrementally varying rotations while driving an output shaft. Therefore the rotations of the output shafts can represent the successive digits of a three digit multiplier. By positioning the sampling gears at desired predetermined points by a lever arrangement at each stage, a multiplier value of three digits is set on the device. Any rotation of the first input shaft is thus converted into three rotations having selected ratios to the original rotation and being in successively lower orders of value, so that proper unification of the three rotations gives an output multiplied to three places over the original rotation. The combination of the three rotations is accomplished by a differential arrangement between the stages.

Although the invention was conceived to fulfill a need in shoran equipment, it will be obvious to those skilled in the art that the novel arrangement presented has many uses in ratio changing and speed multiplying applications. The novel features of the invention as well as the invention itself, both as to its organization and method of operation, will best be understood from the following description, when read in connection with the accompanying drawings in which:

Fig. 2 is a schematic representation of a preferred embodiment of the invention.

Fig. 3 is a detail view of the sampling system employed in the preferred embodiment.

Fig. 4 is a detail exploded view of the differential employed in the preferred embodiment.

Figure 1:
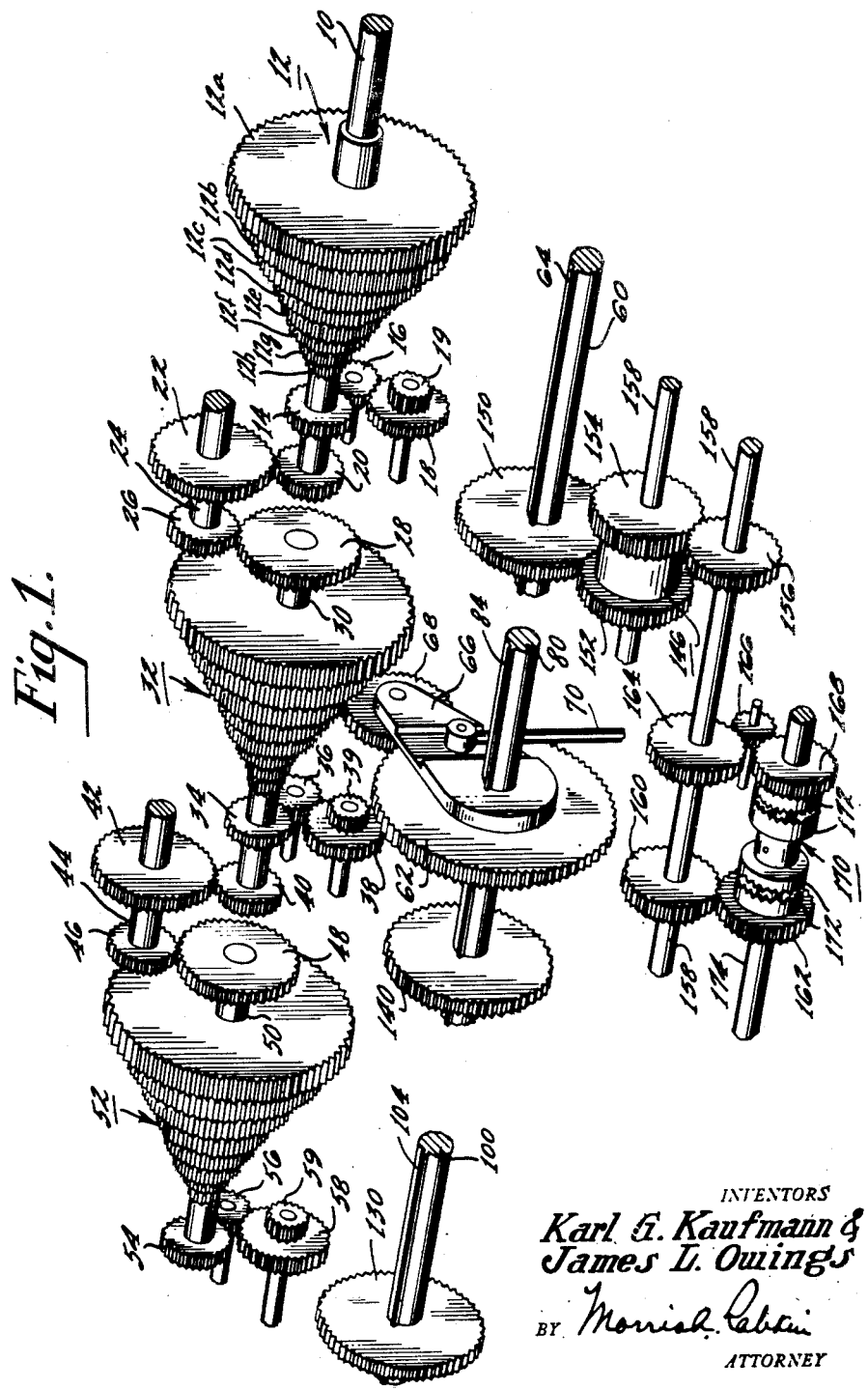
Fig. 1 is a partial perspective view of the cascaded stages in a preferred embodiment of the invention.

Referring to Figs. 1 and 2, a preferred embodiment is shown which exemplifies the structure and operation of the invention. Three similar stages, each having an input shaft 10, 30, 50 with a cone of driving gears 12, 32, 52 mounted on it, are arranged in cascade. The gears on each shaft vary progressively in size, so as to provide 8 increments of a decade. A separate gear train, using a driving gear 14, 34, 54 mounted separately on the input shaft, and serially coupled reducing gears, 16, 18, 19; 36, 38, 39; 56, 58, 59 is used to provide a ninth increment of the decade within each stage. This employs three gears of varying size to produce the equivalent of a 1/10 difference from the previous gear on the cone.

The stage to which the original input rotation is applied is hereafter called the first stage, and the next succeeding stages are hereafter called the second and third stages, respectively. The input shafts in these stages are likewise hereafter called the first, second, and third input shafts.

A driving gear 20 mounted on the first input shaft 10 is coupled to a gear 22 mounted on a transfer shaft 24 which extends to the next stage. On the opposite end of the transfer shaft 24 is another gear 26 in mesh with a driven gear 28 mounted on the second input shaft 30. The ratio in the gear chain between the driving gear 20 mounted on the first input shaft 10 and the driven gear 28 mounted on the second input shaft 30 results in a 10:1 reduction in rotation from the first to the second input shaft. Similarly, the second input shaft 30 is coupled to the third input shaft 50 by a transfer shaft 44 which extends between the stages and has gears 42, 46 at either end, one gear 42 meshing with a driving gear 40 on the second input shaft 30, and the other 46 meshing with a driven gear 48 mounted on the third input shaft 50. A 10:1 reduction ratio is also used in this gear train.

An output shaft is mounted below the input shaft in each succeeding stage, these shafts being called hereafter the first 60, second 80, and third 100 output shafts. Identical sampling systems couple each output shaft to the input shaft within its stage. For simplicity these sampling gears are shown only in the second stage of Fig. 1 and the first stage of Fig. 2, with similar elements being numbered the same. Referring in detail to Fig. 3, a driven gear 62 is mounted on the output shaft 60 and held against free rotation by a longitudinal keyway and key 64 on the shaft. A sampling gear plate 66 rotatably attached to the driven gear 62 and movable with it has mounted in it a sampling gear 68 which meshes with the driven gear 62. A pivoted positioning lever 70 attached to the sampling gear plate 66 extends outside the system housing 120 and fits into positioning holes 122 located at various points on a slot (not shown) along the longitudinal axis of the output shaft 60. The positioning holes 122 are successively indented in the direction of diminishing size of the cone of gears to provide and maintain proper gear mesh. Dependent upon the location of the positioning lever 70, the sampling gear 68 meshes with one of the driving gears, 12a, etc., and is held in place by a spring 72 locked between a fixed ring 74 and a movable washer 76 on the lever. An incline on the inside of the system housing 120 is matched by a corresponding slant on the washer 76. The ratios of the driving gears to the driven gear vary in equal increments from .1 to .9, with the .1 ratio taken off the serially coupled gears 14, 16, 18, 19.

The rotations of the output shafts are combined by a structure shown in Fig. 2. A gear 130 mounted on the third output shaft 100 is coupled to one input 132 of a first differential 136, and a gear 140 on the second output shaft 20 is coupled to the other input 142 of the differential 136. The cage 138 of the first differential 136 is coupled to the cage 148 of a second differential 146. This coupling is shown schematically as a common shaft 144, but it is to be understood that geared couplings may be used if their operative advantages are desired. A gear 150 couples the first output shaft 60 to one input 152 of the second differential 146, and a system output shaft 158 is coupled to the other input 154 of the differential 146 by a gear 156 mounted on it.

A reversing system used in the preferred embodiment is shown in Fig. 1, as well as in Fig. 2. A reversible system output shaft 174 is coupled to the system output shaft 158 through a reversing mechanism. The reversing mechanism comprises two driving gears 160, 164 mounted on the system output shaft, two driven gears 162, 168 rotatably mounted on the reversible system output shaft 174, an idler 166, and a two-way clutch 170. One driving gear 160 meshes directly with one driven gear 162; the other driving gear 164 turns the remaining driven gear 168 through the idler 166. The clutch, consisting of a double faced toothed element 170 slidably mounted on the reversible system output shaft 174, can engage either of similar toothed elements 172 fixed to the driven gears 162, 168.

Operation of the preferred embodiment proceeds as follows. Referring to Fig. 3, a multiplier value of three digits is set on the system by moving the positioning levers to the desired location along the positioning holes. When the handle 78 of a positioning lever 70 is pressed against the housing 120, the sampling gear 68 is in mesh with the aligned gear 12a, etc., in the cone of gears 12 or with the lower one 19 of the serially coupled reducing gears 14, 16, 18, 19. In either case, the sampling gear 68 is held in position with the selected drive gear 12a, etc., by the force of the spring 72 between the ring 74 and washer 76 on the positioning lever 70. At the same time it meshes with the driven gear 62 mounted on the output shaft 60 because the sampling gear plate 66 and driven gear 62 which supports it moves the sampling gear 68 circumferentially around the driven gear 62. In this way the output shaft 60 is turned from the driving gear 12a, and rotates at an incremental speed dependent upon the driving gear selected. If the increment at a stage is to be zero the sampling gear is locked out of rotation with driving gears.

To select a different incremental speed, the positioning lever 70 is pulled out from the housing 120, separating the sampling gear 68 from the driving gear 12a, etc. In the out position the lever can be moved along the longitudinal slot (not shown) without at any time contacting the drive gears. It is then moved to the desired position, set in the positioning hole and moved inward, thus engaging the sampling gear and the desired drive gear. Movement of the positioning lever 70 along the longitudinal slot moves the sampling gear plate 66 holding the driven and sampling gears meshing at all times, as stated before.

The device produces a multiplied output in orderly fashion from this cascade of 3 individual stages. Referring again to Figs. 1 and 2, the first input shaft 10 is given a rotational position from a source elsewhere in the system. Assuming this to be clockwise, the reducing gears 20, 22, 26, 28 coupling the first and the second input shafts 10, 30 and the second and the third input shafts 30, 50 cause the second and the third input shafts 30, 50 to rotate clockwise also, but the second has only 1/10, and the third only 1/100 as much rotational movement as the first. These relative rotations then correspond to succeeding orders of value. The rotation from each selected gear 12, etc., is transmitted through the sampling gear 68, which is in effect an idler, to the driven gear 62 and thence to the output shaft 60 as a clockwise rotation. Since the ratios of driving gear to driven gear are in equal increments of less than unity, the individual output shafts 60, 80, 100 have an incremental rotation corresponding to an integer within the order of value represented by the input shaft of their stage.

The output shafts thus rotate clockwise with individual movements corresponding to the successive digits of the multiplier value. If the multiplier value be 0.367, and the first input shaft 10 is assumed to have a rotation of unity, the first output shaft 60 rotates 0.3 time, the second 80 0.06 time, and the third 100 0.007 time as much. Proper combination of these output shaft rotations then will give the desired multiplied output value from the system.

This combining process is begun by rotating one input 132 of a first differential 136 with the third output shaft 100 rotation of 0.007, and the other input 142 of the differential 136 with the second output shaft 80 rotation of 0.06. The differential of the preferred embodiment is shown in detail in Fig. 4. It is of a type well known in the art, wherein application of rotations in the same direction to each of two inputs 132, 142 results in rotation in the same direction of a cage 138 at one-half the sum of the input rotations. Conventional gearing methods are used to employ this differential in the system. In the schematic presentation of Fig. 2, however, the output shafts 80, 100 are coupled by gears 130, 140 to the inputs 132, 142 of the first differential 136 and rotate the inputs 132, 142 in the same direction, in this case counter-clockwise. The cage 138 of the differential thus rotates counter-clockwise at one-half the sum of the two rotations, or $$\frac{0.06+0.007}{2}$$

This cage 138 is directly coupled to the cage 148 of the second differential 146, by what is shown schematically in Fig. 2 as a common shaft 144. It is to be understood that conventional gearing methods would provide an equivalent direct drive with the differential of Fig. 4. The coupling of the cages of the differentials effectively eliminates the need for doubling the speeds derived from the cages of each differential which would arise if the cages of both represented output. The operation of the cages is reversed; therefore, speed division by the first cage 138 operating as an output is cancelled through speed multiplication by the second cage 148 operating as an input. With a counter-clockwise rotation of 0.3 on one input 152 of the second differential 146 through the gear 150 coupling the input 152 to the first output shaft 60, the remaining input 154 rotates at $$0.3+0.06+0.007$$

counterclockwise. This differential input rotation represents the system output, and the system output shaft 158 is driven clockwise by a gear 156 driven by this input. Its rotation is the sum of the rotations of the 3 output shafts, or 0.367.

To permit more ready adaptation of this output to external systems, a reversing device is provided which can turn the reversible system output shaft 174 in either direction of rotation with a given input rotation. If the same direction of rotation is desired the two way clutch 170 drives the reversible system output shaft 174 through an idler 166, and if reversal is desired driving and driven gears 160, 162 mesh directly.

Thus it will be apparent that in the preferred embodiment the invention provides a means for multiplying rotational values by figures from zero to 0.999, and that the input and output can vary bidirectionally and assume any angular position without affecting the operation of the system. Because the system can operate on plus and minus values, it is accurate to 1 part in 2,000. It maintains that accuracy no matter what the multiplier value chosen. It further has the important advantages that it is independent of random changes in its environment such as heat, load, and speed of operation, and that being gear driven, it is nearly instantaneous, is precisely indexed at all times and requires little power to operate. For Shoran equipment a 3 stage multiplier occupies only some 3" x 3" x 9".

The preferred embodiment uses a gear train separate from the cone of gears to provide the smallest increment of rotation in each stage. This is done to permit a greater input shaft size and to avoid the use of a low number of teeth on the smallest driving gear. It will be apparent to those skilled in the art, however, that all 9 driving gears could be placed on the cone, and that if desired 10 gears could be used, to increase the range of a 3 stage multiplier from 0.999 to 1.099, plus or minus. It will also be apparent that the number of driving gears, and the number of stages, can vary with the application in which the multiplier is used. Since rotational values are involved it is of course evident that the advantages apply whether the device is employed to convert rotational position or rotational speed.

Thus there has been described a novel and efficient gear ratio changer having a plurality of cascaded stages, and a wide range of system values derived from incremental variations within each stage.

What is claimed is:

A speed multiplier system having first, second and third decade stages in cascade comprising an input shaft and an output shaft within each decade stage, a plurality of gears serially coupling said input shafts for rotating said input shafts at successively lower order speeds, a cone of gears within each decade stage fixedly mounted on the input shaft for providing a plurality of rotational increments, geared ratio changing means within each decade stage to provide an added rotational increment to said plurality of rotational increments, a driven gear within each decade stage mounted on the output shaft in fixed rotative relation thereto, said driven gear being movable along said output shaft, a sampling gear within each decade stage engaging the driven gear and movable therewith along said output shaft, said sampling gear being rotatable about said driven gear whereby to selectively engage said cone of gears and said geared ratio changing means, means within each decade stage to independently position the driven gear and sampling gear, a pair of differentials each having a cage and a pair of inputs, a first of said pair of differentials being coupled at its inputs to the output shafts of said second and third decade stages respectively, a second of said pair of differentials being coupled at one input to the output shaft of said first decade stage, the cages of said differentials being coupled together, a system output shaft coupled to the other input of said second of said pair of differentials, a reversible system output shaft parallel to said system output shaft, means coupling said system output shaft and said reversible system output shaft for reversibly driving said reversible system output shaft.

References Cited in the file of this patent

UNITED STATES PATENTS

| | | |
|---|---|---|
| 1,709,233 | Schroeder | Apr. 16, 1929 |
| 1,852,282 | Biggert | Apr. 5, 1932 |
| 2,521,771 | Bechle | Sept. 12, 1950 |
| 2,600,562 | Meyer | June 17, 1952 |

FOREIGN PATENTS

| | | |
|---|---|---|
| 993,881 | France | Aug. 3, 1951 |
| 545,660 | Great Britain | June 8, 1942 |